United States Patent [19]
Dysarz

[11] Patent Number: 5,813,163
[45] Date of Patent: Sep. 29, 1998

[54] MUTLIDIRECTIONAL ROD, UMBRELLA AND TOOL HOLDING DEVICE

[76] Inventor: Edward D. Dysarz, 11423 Triola Ln., Houston, Tex. 77072

[21] Appl. No.: 880,712

[22] Filed: Jun. 23, 1997

[51] Int. Cl.[6] .................................................. A01K 97/10
[52] U.S. Cl. ........................... 43/21.2; 248/520; 248/534; 248/538; 211/70.8
[58] Field of Search ............................... 43/21.2; 211/70.8; 248/534, 538, 540, 514, 520, 539

[56] References Cited

U.S. PATENT DOCUMENTS

| | | | |
|---|---|---|---|
| 2,541,146 | 2/1951 | Bahr | 211/70.8 |
| 2,954,909 | 10/1960 | Miller et al. | |
| 4,176,819 | 12/1979 | Lowe | 248/520 |
| 4,637,156 | 1/1987 | Simmons | |
| 4,848,021 | 7/1989 | Simko | 43/21.2 |
| 5,120,016 | 6/1992 | Dysarz | |
| 5,566,495 | 10/1996 | Kim | 43/21.2 |
| 5,632,112 | 5/1997 | Steinborn | 43/21.2 |

*Primary Examiner*—Jack W. Lavinder

[57] ABSTRACT

A device that can be fixed to a sun deck, dock and pier by means of an inverted T fixed to the second end of said device wherein said inverted T bar is placed into the gap between the planks or boards that comprise the deck, dock or pier wherein said inverted T is rotated to wherein the inverted T extends below the underside of said planks or boards and wherein a threaded base member is turned on the second end of said device further fastening said device to the topside of said boards or planks thereby locking said device to said boards or planks for the placement of and support for fishing rods, tools, umbrellas or other devices wherein multiple fishing rods or tools may be placed at different horizontal and vertical angles relative to one another.

4 Claims, 8 Drawing Sheets

MUTLIDIRECTIONAL ROD, UMBRELLA AND TOOL HOLDING DEVICE

There are various means for supporting fishing rods, umbrellas and other devices on sun decks, docks and piers. There are rail mounted rod holders that clamp onto a rail of a dock or boat, and there are other types of fishing rod holders that are patented. Three fishing rod holder patents are Miller, et al., U.S. Pat. No. 2,954,909 issued Oct. 4, 1960, Simmons, U.S. Pat. No. 4,637,156 issued Jan. 20, 1987 and Dysarz, U.S. Pat. No. 5,120,016 issued Jan. 9, 1992.

All of these patents teach a fishing rod holder that are comprised of at least five (5) or more parts and can hold only one fishing rod in only one direction or angle at one time.

There are many other rod holders available, but they are comprised of many more parts than the rod holder of the present invention and they can hold only one fishing rod at one time or they require two or more base members.

SUMMARY

It is the object of the present invention to make a satisfactory fishing rod or umbrella holding device or tool holding device that will take up little space and yet be firmly fixed to a sun deck, dock or pier.

It is still another object of the present invention to provide a fishing rod holding device that can hold two or more fishing rods at one time.

It is yet another object of the present invention to provide a fishing rod holder that can hold at least two fishing rods wherein each fishing rod is directed at a different side of a dock.

It is still yet another object of the present invention to provide a fishing rod holder that will require fewer parts to manufacture and therefore cost less and still be more functional than other fishing rod holders.

The features of the present invention can best be understood together with further objects and advantages by reference to the following descriptions taken in conjunction with accompanying drawings wherein like numerals indicate like parts.

DETAILED DESCRIPTION OF THE PREFERRED EMBODIMENT

Figure 1:
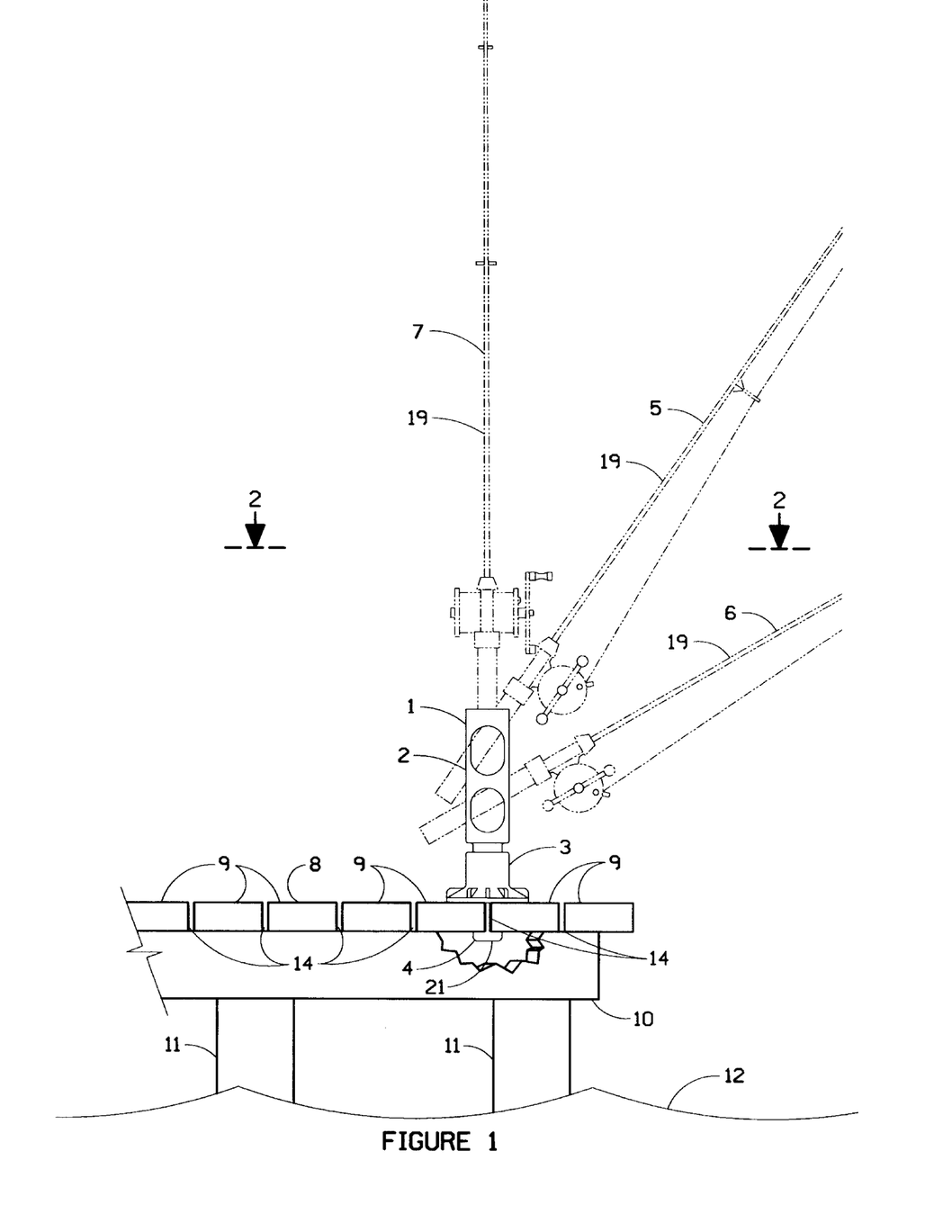
FIG. 1 is an elevation view describing the three angles that the device can hold one or more fishing rods.

Referring to FIG. 1, there is shown an elevation view of the device 1 of the preferred embodiment.

The device 1 is comprised of only three parts: the rod holder 2 that is an elongated hollow tube with a first end, a second end, and an inside and an outside is the first part; the base member 3 is the second part, and the imbed H bar 4 is the third part. The device 1 is shown set on a dock 8 that is comprised of planks 9 or boards. The planks 9 have a gap 14 between said planks for rain water and wave water to flow through. The planks 9 with gaps 14 between each plank 9 is common for docks 8, decks or piers. The dock 8 is further shown with at least one plank support beam 10 and at least one dock support stanchion 11 which is also common for docks, decks and/or piers. The dock 8 is further shown in the water 12.

The device 1 is set on the dock by placing the second end of the imbed H bar 4 into the gap 14 wherein the second end of the imbed H bar 4 or lower inverted T 21 is parallel to the gap 14 and wherein when the inverted T 21 is below the underside of at least two planks 9 wherein the imbed H bar 4 is rotated at least fifteen degrees (15°), but it could also be rotated more than ninety degrees (90°) until the inverted T 21 is underneath at least two planks 9. With the inverted T 21 underneath the two planks 9 the base member 3 is rotated in the direction necessary to cause the second end of the base member 3 to move in the direction of the top of the planks 9 until the base member 3 pulls up on the rod holder 2 and the imbed H bar 4 thus pulling up on the lower inverted T 21 until the upper surface of the lower inverted T 21 comes in contact with the underside of the planks 9 thus locking the planks 9 between the lower end of the base member 3 and the upper end of the inverted T 21 thereby locking the device to the planks 9 of the dock 8 and further allowing a fishing rod 19 to be placed in the device in the first position 5, the second position 6, the third position 7, all at the same time or in any one position at different times.

Figure 2:
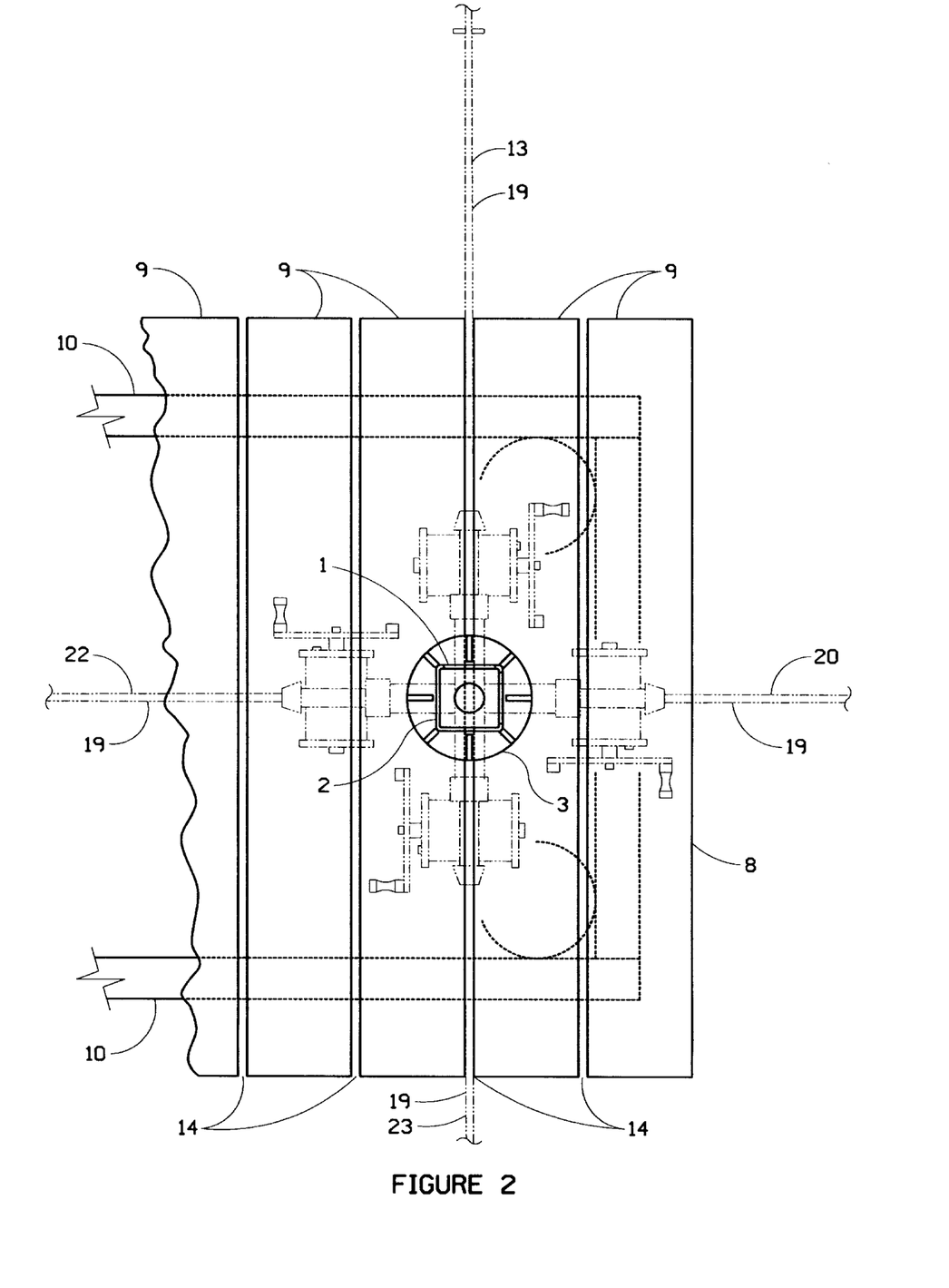
FIG. 2 is a plan view of the device describing the various directions to horizontal that fishing rods can be placed.

Referring to FIG. 2, there is shown a plan view of the device 1 on a dock 8.

Planks 9 are shown with gaps 14 between each plank 9. Two planks support beams 10 are shown below the planks 9.

The device 1 is shown with a fishing rod 19 shown in a first direction 13 and a second fishing rod 19 in a second direction 20. The fishing rod 19 could also be placed in a third direction 22 or a fourth direction 23. It is possible to hold at least two fishing rods 19 pointing in two or more directions at the same time, with only one rod holder 2.

Although the rod holder 2 is shown a square, it could be round, triangular, rectangular or other shape by design choice.

Figure 3:
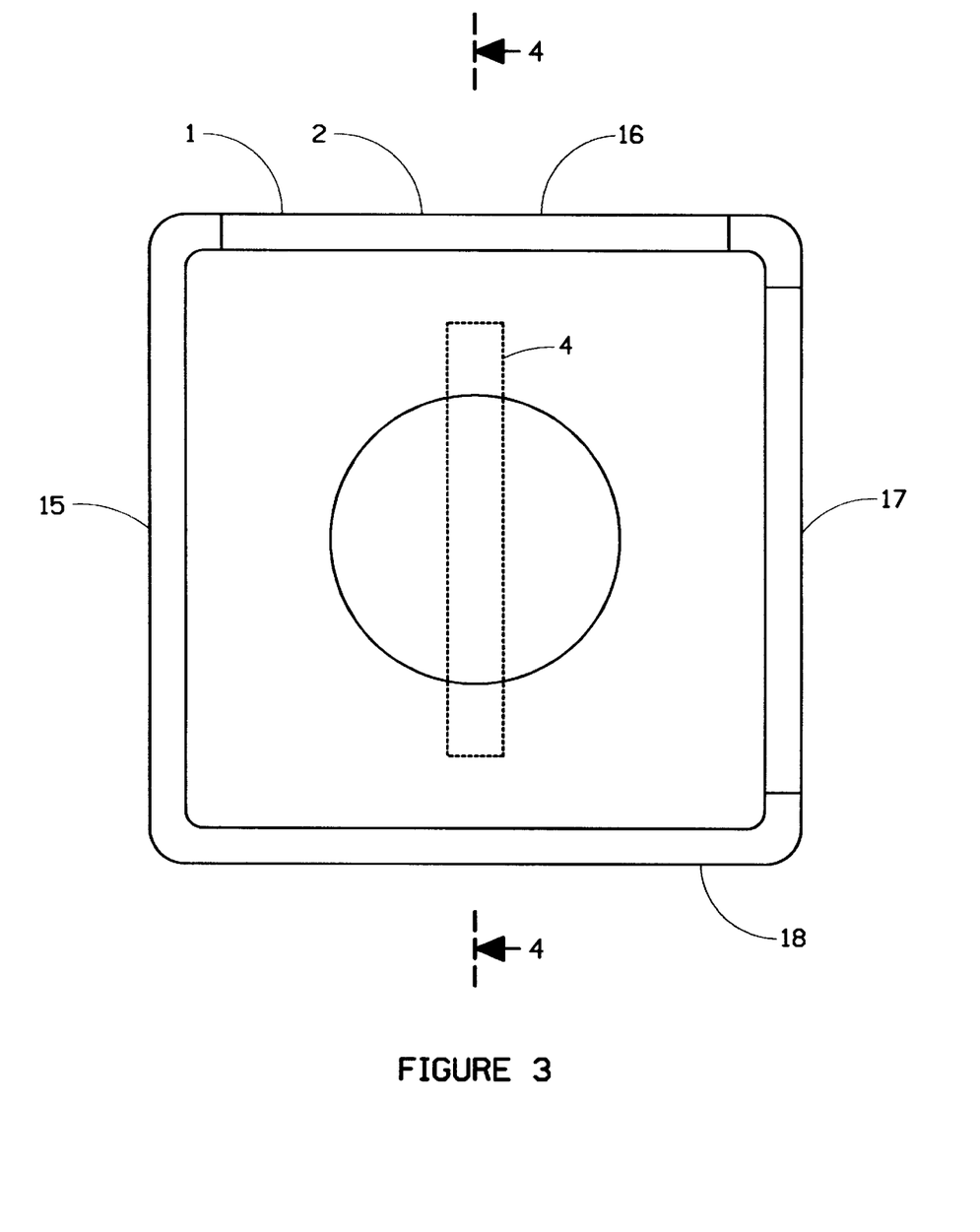
FIG. 3 is a plan view of the first end of the device.

Referring to FIG. 3, there is a plan view of the first end of the square rod holder 2 of the device 1.

The square rod holder 2 is shown with a first side 15, a second side 16, a third side 17, and a fourth side 18. The second side 16 and the third side 17 are similar to each other in hole and slot configuration. The first side and the fourth side are also similar to each other in hole configuration. The similarities of hole and slot configuration of the second side and third side and the hole configuration of the first side 15 and the fourth side 18 allow the rod holder 2 to be rotated one hundred eighty degrees (180°) and be used in the same way in the opposite direction if one is fishing on the other side of the dock.

Figure 4:
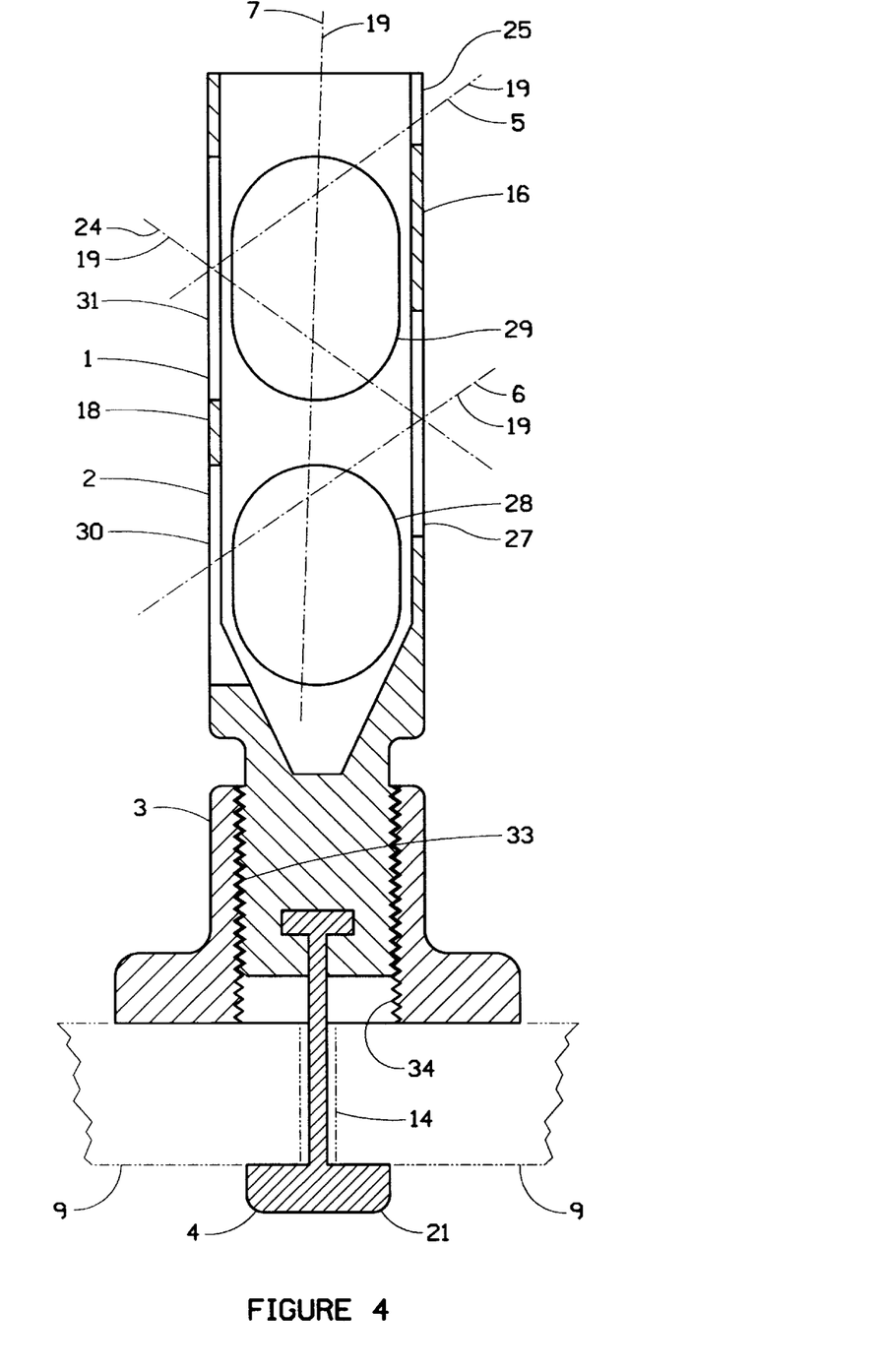
FIG. 4 is a section elevation of the device as taken through FIG. 3.

Referring to FIG. 4, there is shown a section elevation view of the device 1 as taken through FIG. 3.

The rod holder 2 is shown with a first end and a second end. The second end is shown with the imbed H bar 4 imbedded in the plastic rod holder 2. Plastic is used by design choice, but it could be steel, aluminum or other suitable material by design choice. The second end of the rod holder 2 is also shown with outside threads 33 formed on the outer periphery. The outside threads 33 suitably mesh with the inside threads 34 formed on the inside of the base member 3.

The imbed H bar 4 has been inserted through the gap 14 between the planks 9, rotated to where the lower inverted T 21 is below the planks 9 and the base member 3 is turned in a suitable direction while the rod holder 2 is held and prevented from turning. As the base member 3 is turned, the outside threads 33 of the rod holder 2 react with the inside threads 34 of the base member 3, causing the rod holder 2 to move in an upward direction 35 further pulling up on the imbed H bar 4 until the lower inverted T 21 of the imbed H bar 4 is compressed against the underside of the planks 9 and the second end of the base member 3 is compressed against the top side of the planks 9 thereby locking the device to the planks 9; to remove the device 1 from the planks 9 the base member 3 is rotated in the opposite direction until the lower inverted T 21 no longer is in contact with the underside of the planks 9 after which the rod holder 2 is rotated until the lower inverted T 21 is parallel to the gap 14 and the inverted T 21 is pulled out of the gap 14.

At the first end of the rod holder 2 there are shown the various holes and slots and their relationship to each other. It should be noted that no holes on one side are at the same elevation as holes on the opposite side; therefore, holes on the first side are at a different elevation then holes on the fourth side 17 and holes on the second side are at a different elevation than holes on the third side. The different elevations will allow the fishing rod or fishing rods to be placed in the holes of the rod holder at an angle off of horizontal and therefore prevent the fishing rod from being pulled out by a fish.

In FIG. 4, the fishing rods 19 are represented by a centerline for clarity.

One fishing rod 19 is shown in the first position 6 wherein the fishing rod is inserted into the first hole 27 on the second side 16 and the fourth hole 30 on the fourth side 18. A fishing rod 19 is shown in the first position 5 wherein it is placed into the first slot 25 on the second side 16 and the fifth hole 31 on the fourth side 18. A third fishing rod 19 is placed in the third position 7 through the inside of the hollow or open center of the rod holder 2 of the device 1. A fourth fishing rod 19 is placed in a fourth position 24 through the fifth hole 31 on the fourth side 18 and the first hole 27 on the second side 16. As shown, there is a possible combination of four possible positions in which to inset a fishing rod in one setting; however, the same number of possible combinations exists if fishing rods were to be placed in the rod holder 2 from the holes in the first side and the third side which would be eight possible fishing rod placements. If the rod holder were rotated one hundred eighty degrees (180°), another eight possible combinations would be possible and if the rod holder were lengthened and more holes were added, the combination of angles and directions that the fishing rod or rods could be placed would increase. All of these possible combinations are possible with a device 1 that is comprised of only three parts.

Figure 5:
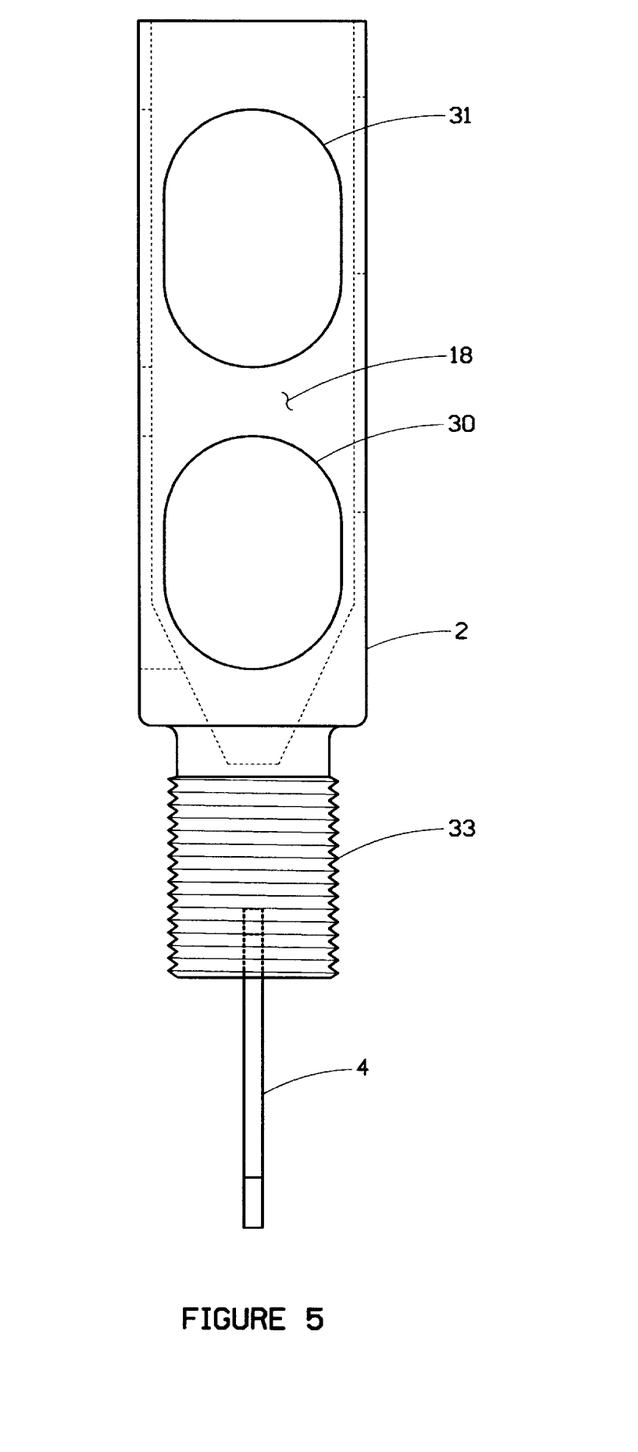
FIG. 5 is an elevation view of the device showing the fourth side.

Referring to FIG. 5, there is shown an elevation view of the outside of the fourth side 18 of the rod holder 2. The fourth hole 30 and the fifth hole 31 are shown on the fourth side 18. The outside threads 33 are shown at the second end of the rod holder 2. The imbed H bar 4 is shown at the second end of the rod holder 2.

Figure 6:
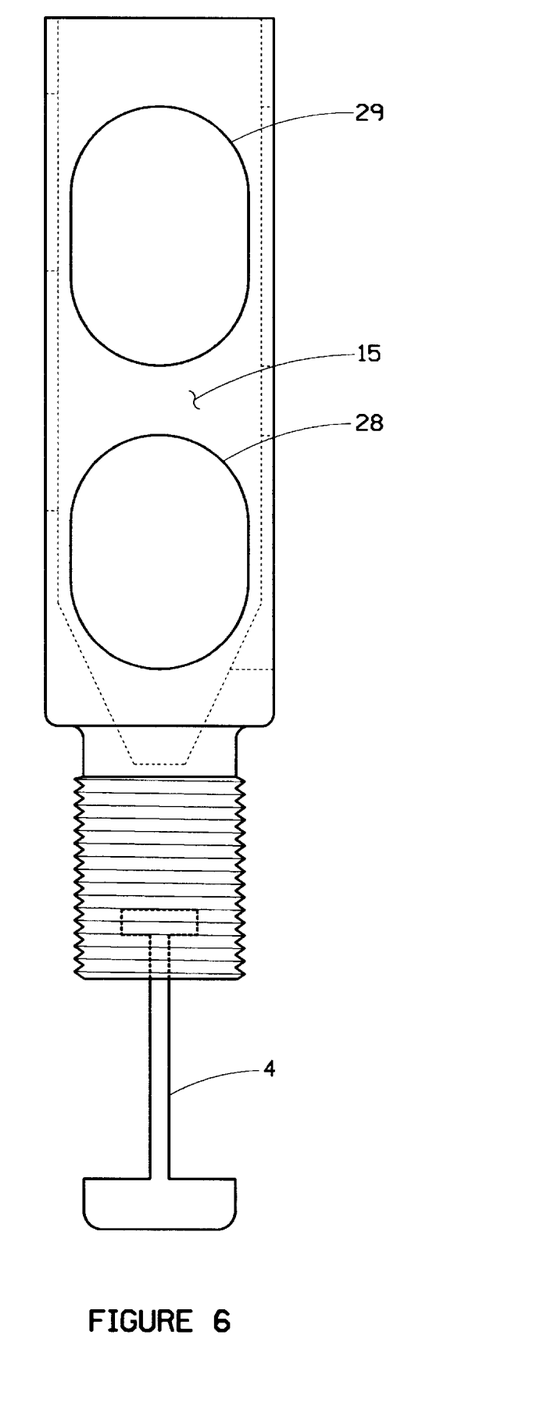
FIG. 6 is an elevation view of the device showing the first side.

Referring to FIG. 6, there is shown an elevation view of the outside of the first side 15 of the rod holder.

The second hole 28 and the third hole 29 are shown formed in the first side of the rod holder 2. The imbed H bar 4 with lower inverted T 21 are shown at the second end of the rod holder 2.

Figure 7:
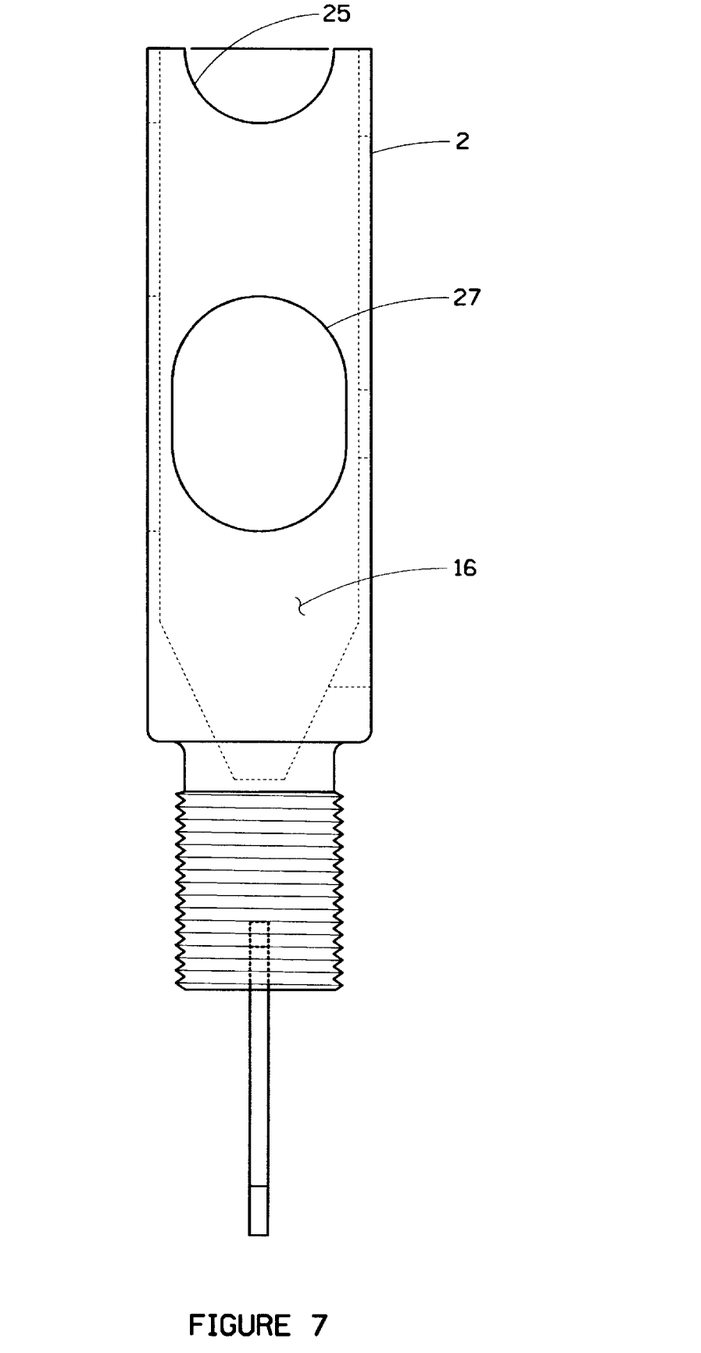
FIG. 7 is an elevation view of the device showing the second side.

Referring to FIG. 7, there is shown an elevation view of the outside of the second side 16 of the rod holder 2.

The first slot 25 is shown at the first end of the rod holder 2 and the first hole 27 is shown near the center of the rod holder 2.

Figure 8:
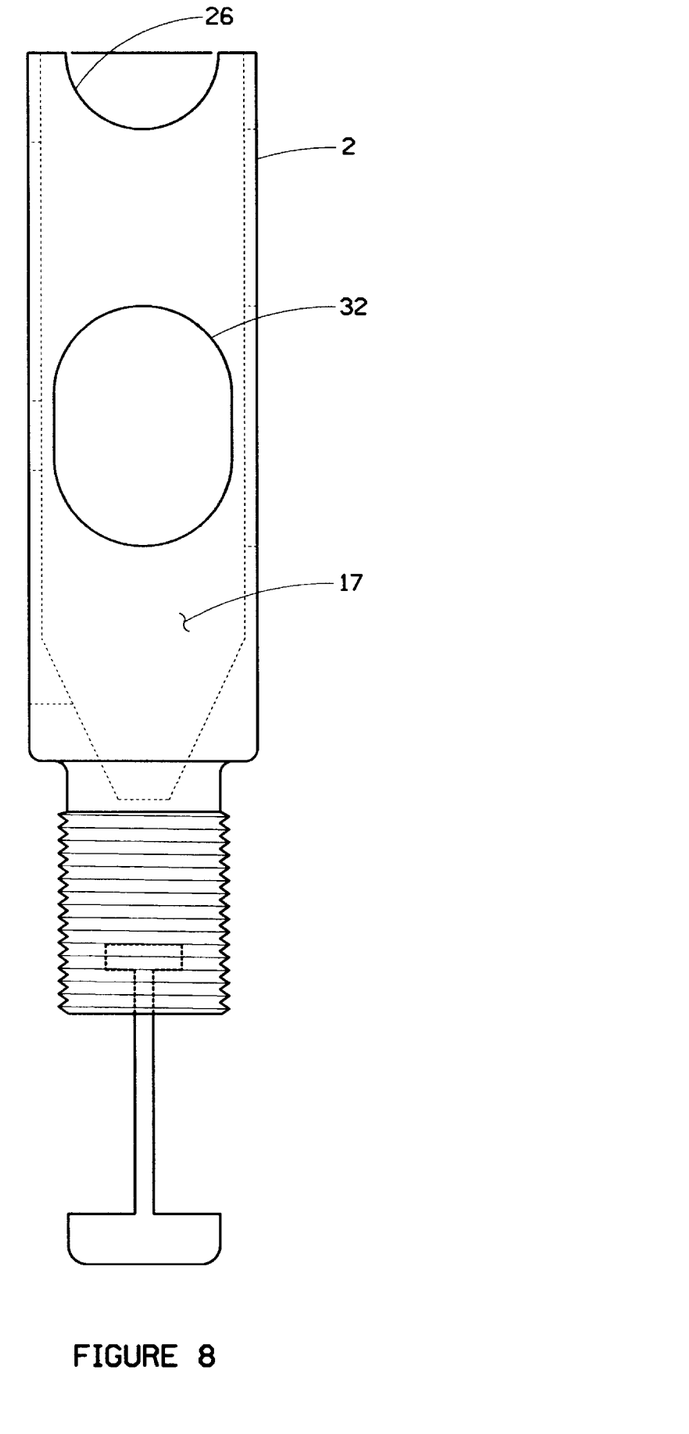
FIG. 8 is an elevation view of the device showing the third side.

Referring to FIG. 8, there is shown an elevation view of the outside of the third side 17 of the rod holder 2.

The second slot 26 is shown at the first end of the rod holder 2 and the sixth hole 32 is shown near the center of the rod holder 2.

Although the system described in detail supra has been found to be most satisfactory and preferred, many variations are possible. For example, the rod holder could be round or triangular, the rod holder could be longer with three or four holes in line on each side and the holes could be square or triangular or round. The holes could also be on the corners of the box rod holder. The configuration of the rod holder could be a pentagon, a hexagon or an octagon.

Although the invention has been described with reference to the preferred embodiment, it will be understood by those skilled in the art, that additions, modifications, substitutions, deletions, and other changes not specifically described may be made in the embodiments herein, it should be understood that the details herein are to be interpreted as illustrative and are not in a limiting sense.

What is claimed as invention is:

1. A device to hold at least one fishing rod or multiple fishing rods or tools on a dock, deck, or pier with planks or boards comprising:

a rod holder with a first end, a second end, an inside, an outside, a first side, a second side, a third side, and a fourth side wherein at least one hole is formed in said first side and at least one notch and one hole is formed in said third side, and at least one notch and one hole is formed in said second side and at least one hole is formed in said fourth side and wherein said one hole formed in said first side is closer to said second end of said rod holder than said hole formed in said third side and wherein said hole formed in said second side is closer to said first end of said rod holder than said hole formed in said fourth side and wherein said second end of said rod holder has threads formed on the outside;

a imbed H bar with a first end and a second end wherein said first end of said imbed H bar is imbedded into said second end of said rod holder and said second end of said imbed H bar is formed into an inverted T and wherein said second end of said imbed H bar extends past said second end of said rod holder;

a base member with a first end and a second end and with an inside and an outside and wherein said inside has threads and wherein said threads are compatible with said threads formed on said second end of said rod holder and wherein said base member is disposed over said second end of said rod holder and said threads formed on said rod holder mesh with said threads formed on the inside of said base member and wherein said inverted T is inserted into a gap between said planks forming said dock, pier, or deck and wherein said inverted T is below the underside of said planks and said inverted T is rotated until said inverted T is below said underside of said planks and said base member is rotated about said lower end of said rod holder wherein said base member is forced into the topside of said planks and said inverted T is forced into said bottom side of said planks thus locking said device to said planks of said dock, pier, or deck wherein said fishing rod is inserted into said hole on said third side and said hole on said first side thereby holding at least one said fishing rod at an angle.

2. The device of claim 1 wherein said rod holder will hold two or more fishing rods at the same time.

3. The device of claim 1 wherein said rod holder will hold two or more fishing rods at different angles to horizontal.

4. The device of claim 1 wherein said rod holder will hold two or more fishing rods at different angles to vertical.

\* \* \* \* \*